United States Patent [19]
Guthrie

[11] 3,929,316
[45] Dec. 30, 1975

[54] NON-FLOATING SEAT STRUCTURE FOR EXPANDING GATE VALVES

[75] Inventor: Larry E. Guthrie, Houston, Tex.

[73] Assignee: ACF Industries, Incorporated, New York, N.Y.

[22] Filed: Nov. 7, 1974

[21] Appl. No.: 521,825

[52] U.S. Cl. .................. 251/196; 251/328; 251/363
[51] Int. Cl.² .......................................... F16K 25/00
[58] Field of Search ........... 251/196, 282, 328, 362, 251/363

[56] References Cited
UNITED STATES PATENTS

| | | |
|---|---|---|
| 2,204,142 | 6/1940 | MacClatchie .................. 251/196 X |
| 2,954,960 | 10/1960 | Dunbar .......................... 251/328 X |
| 3,068,901 | 12/1962 | Anderson ....................... 251/196 X |
| 3,743,244 | 7/1973 | Dickenson ...................... 251/328 X |

*Primary Examiner*—Harold W. Weakley
*Attorney, Agent, or Firm*—Eugene N. Riddle

[57] ABSTRACT

A non-floating seat structure for an expanding gate valve having a seat positioned on each side of the gate assembly with each seat fitting within an adjacent recessed valve body portion. The seats and the associated valve body portions have axially aligned annular grooves therein with the grooves in the seats facing and positioned opposite the grooves in the adjacent valve body portions. Teflon ring seals are inserted within the grooves when the seats are pressed within the body recesses and provide a fluid tight barrier to line pressure thereby to minimize the area of the seats exposed to line pressure for preventing any floating or movement of the seats out of the body recesses.

9 Claims, 6 Drawing Figures

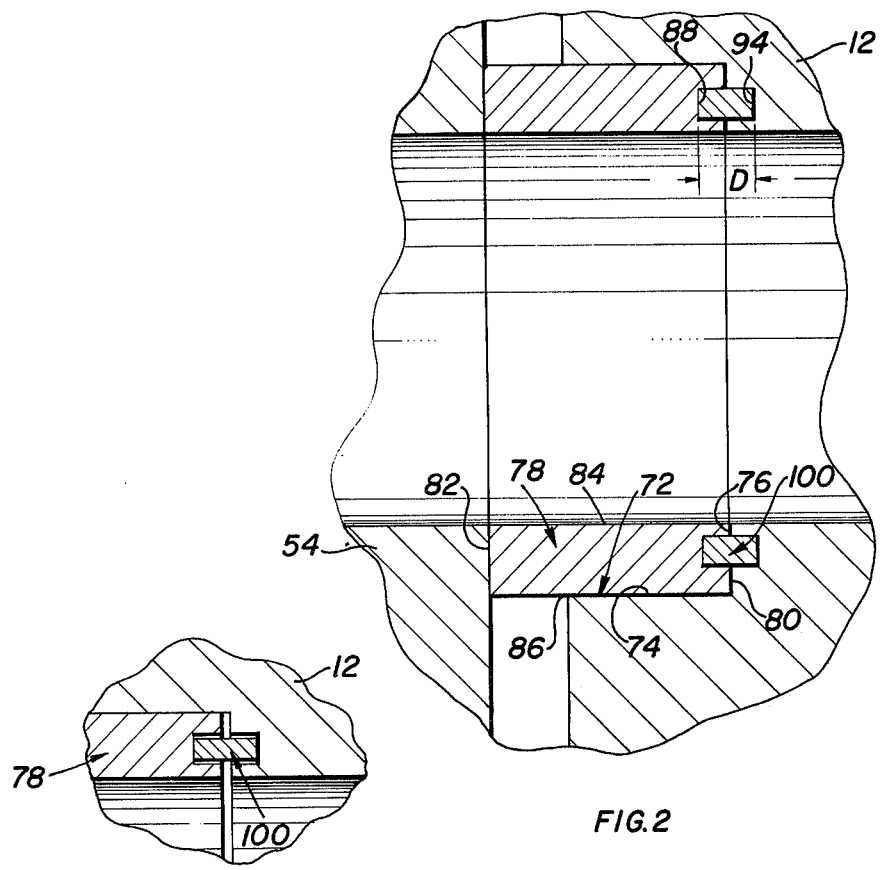
FIG.2
FIG.4
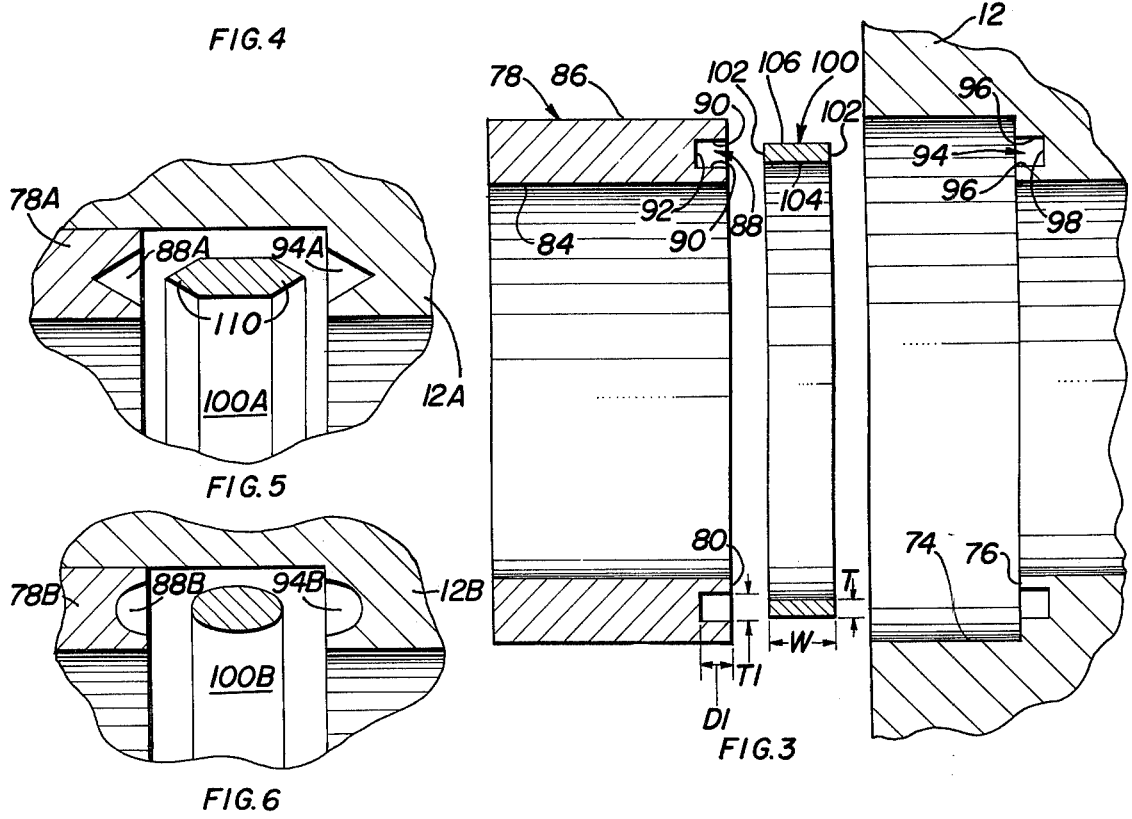
FIG.5
FIG.6
FIG.3

NON-FLOATING SEAT STRUCTURE FOR EXPANDING GATE VALVES

BACKGROUND OF THE INVENTION

A gate valve of the expanding gate type has a gate formed of two cooperating gate elements or parts and a pair of seats on the opposite sides of the gate with means to expand the two gate elements into seating engagement with the valve seats when the valve is closed and for contracting the two gate elements to permit the gate to slide relative to the seats during opening and closing movements of the gate. In the construction of gate valves of the expanding type as heretofore provided, recesses are formed in the valve body surrounding the flow passages on each side of the gate and seats of a generally annular construction are pressed in the recesses with their inner end faces positioned in sliding contact with the parts of the expanding gate. The seats are usually exposed to the pressure of fluid in the adjacent flow passage so that when the gate is in a closed position, line pressure particularly from the upstream flow passage may enter the recess behind the upstream seat to cause the upstream seat to float or move inwardly toward the gate with the result that possible binding of the parts of the gate may result or rapid wear of the seats may take place upon subsequent movement of the gate. When a seat floats or moves inwardly toward the gate, the seat is forced out against the gate element causing an undesirable drag requiring a higher torque to operate the valve and resulting in wear particularly on the upstream seat. Further, it is difficult to obtain a tight seal if the gate, seat and recess are not in exact parallelism. Various means have been proposed to eliminate the undesirable floating action of the seat member such as shown in U.S. Pat. No. 2,954,960 dated Oct. 4, 1960 and U.S. Pat. No. 3,006,601 dated Oct. 31, 1961. One proposal has been to equalize immediately upon contraction of the gate elements the pressure on the opposite faces of the seats so that the pressure does not cause the seats to move or float outwardly against the gate to drag on the adjacent gate element.

DESCRIPTION OF THE INVENTION

The present invention is directed particularly to an expanding gate valve structure in which relatively high fluid pressures, such as 20,000 psi, are provided in the flow passages. The expanding gate valve structure has a body chamber in which an expanding gate assembly is mounted for movement. The gate assembly includes a gate element connected to a gate stem and a segment is carried by the gate element for expanding movement relative to the gate element. The valve body surrounding the flow way on opposite sides of the valve body chamber has annular recesses in which annular seats are pressed. The back faces of the seats and the adjacent opposed annular body surfaces have facing annular grooves therein. An annular seal, preferably formed of Teflon, is positioned within the facing grooves when the seats are pressed in position within the body recesses and the seal is of a cross-sectional area before insertion slightly larger than the cross-sectional area of the two opposed grooves thereby requiring at least a minimum amount of compression of the seals after the seals are pressed in position but not of a cross-sectional area large enough to prevent metal to metal contact between the seats and the adjacent body portions.

Such an arrangement provides a fluid tight barrier to fluid pressure tending to seep behind the seats and float or move the seats toward the gate. The area of the seats exposed to fluid pressure is thus minimized and a non-floating seat is provided.

BRIEF DESCRIPTION OF THE DRAWINGS

In the accompanying drawings in which several various possible embodiments of the invention are illustrated.

FIG. 2 is an enlarged fragment of FIG. 1 showing a seat in position with a seal positioned within opposed aligned grooves of the seat and adjacent body portion;

FIG. 3 is an exploded view of the structure shown in FIG. 2 with the seat and seal shown prior to assembly within the body portion;

FIG. 4 is a fragmentary sectional view showing the seat and seal in an intermediate position prior to the seat being pressed into a metal to metal contact with the recessed body portion;

FIg. 5 is a fragmentary view of a further modification of the present invention in which a seal is positioned within grooves generally V-shaped in cross section; and FIG. 6 is a fragmentary view of a modification of the present invention in which a seal is positioned within grooves generally of an arcuate cross section.

Figure 1:
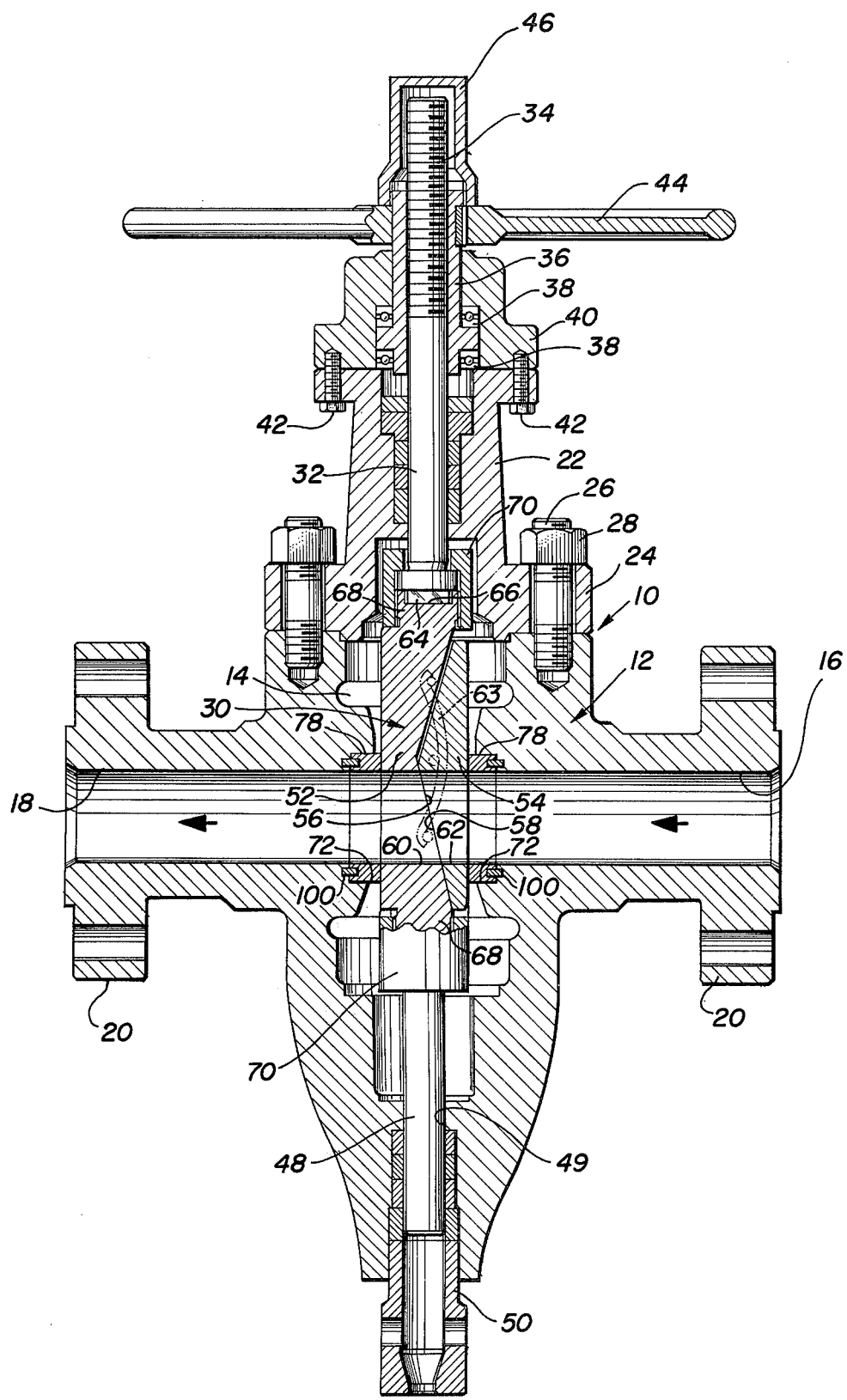
FIG. 1 is a cross section of a hydraulically balanced gate valve structure having an expanding gate assembly embodying the present invention.

Referring now to the drawings for a better understanding of the invention, a gate valve structure generally indicated 10 includes a valve body generally designated 12 having a valve chamber 14 therein. An inlet flow passage 16 and an outlet flow passage 18 communicate with valve chamber 14. Flanges 20 on the ends of valve body 12 may be suitably connected to a pipeline or other flow system as is well known in the art. A bonnet 22 has a lower flange 24 which is secured by studs 26 and nuts 28 to the upper end of body 12.

The gate valve assembly generally indicated 30 is mounted within chamber 14 for movement between open and closed positions relative to flow passages 16 and 18. An upper operating valve stem 32 has an upper threaded portion 34. Internally threaded drive sleeve 36 is supported for rotary movement relative to bonnet 22 by thrust bearings 38 mounted within a bearing housing 40. Bearing housing 40 is secured by studs 42 to the upper end of bonnet 22. A handwheel 44 is disposed at the upper end of drive sleeve 36 and is retained thereon by stem cover 46. It is understood that any one of a number of possible manual or power operated mechanisms may be provided to control the movement of operating stem 32. Mounted adjacent the lower end of gate assembly 30 is a pilot or balancing stem 48. Balancing stem 48 is received by an opening 49 in body 12 which communicates with chamber 14 and a lower sleeve 50 is telescoped within opening 49. Stems 32 and 48 are substantially the same cross-sectional areas so that the areas of gate assembly 30 exposed to fluid pressure adjacent stems 32 and 48 are equal. Fluid pressure in chamber 14 above and below gate assembly 30 are therefore equalized and gate assembly 30 is hydraulically balanced.

Gate assembly 30 includes a gate element 52 and a complementary segment 54. Gate element 52 has a concave V-shaped back face 56 and segment 54 has a complementary convex V-shaped back face 58 to fit V-shaped face 56 and upon longitudinal movement between gate element 52 and segment 54 to expand gate assembly 30 outwardly. Suitable ports 60 and 62 are provided in gate element 52 and segment 54 to align with flow passages 16 and 18 in an open position of gate assembly 30. A spring 63 continuously urges gate element 30 and segment 54 toward a collapsed or retracted position.

Operating stem 32 and pilot stem 48 are connected to gate assembly 30 in identical fashion. Each stem 32 and 48 has an elongate key 64 which is received within an elongated slot 66 on an externally threaded extension 68 provided adjacent each end of gate element 52. Connector nuts 70 connect operating stem 32 and pilot stem 48 to threaded extensions 68 on opposite ends of gate element 52.

Flow passages 16 and 18 adjacent chamber 14 have annular recesses generally designated 72 defined by outer radial surfaces 74 and annular surfaces or ledges 76 extending in a direction generally perpendicular to radial surfaces 74. A seat ring generally designated 78 has a back face surface 80 and a front face surface 82 with an inner circumference 84 and an outer circumference 86. Back face surface 80 has an annular groove generally designated 88 therein defined by a pair of opposed side walls 90 and an end wall 92. Annular surface 76 has a facing annular groove 94 defined by side walls 96 and end wall 98.

A seal generally designated 100, preferably formed of nylon or tetrafluoroethylene sold under the trademark "Teflon", has a generally rectangular cross section to provide opposed end surfaces 102 and circumferential inner and outer surfaces 104 and 106 respectively. Annular grooves 88 and 94 face each other and are of substantially the same thickness T1 and depth D1. Seal 100 has a width W which is greater than the combined depths D of grooves 88 and 94. The thickness T of seal 100 is less than the thickness T1 of grooves 88 and 94 and satisfactory results have been obtained with thickness T being between around 70 and 90% of thickness T1 of grooves 88 and 94. Seal 100 preferably is of a width W sufficient to provide a compression of seal 100 while permitting a metal to metal contact for seats 78 against ledges 76 without any portion of seal 100 flowing between surfaces 76 and 80 and thereby being pinched. Thickness T of seal 100 is sufficient to permit such compression without buckling. Effective results have been obtained with width W being between around 105 and 130% of the total combined depth D of grooves 88 and 94.

When seats 78 are pressed within recesses 72, seals 100 are compressed and a metal to metal contact is provided between surfaces 76 and 80 with seals 100 not flowing or being pinched between surfaces 76 and 80, and substantially filling the volume of grooves 88 and 94. For satisfactory results and employing a Teflon seal, it has been found that seal 100 should fill at least around 80% of the total cross-sectional area of combined grooves 88 and 94 and 100% would be optimum. However, it is very difficult to obtain 100% without a portion of the seal flowing between surfaces 76 and 80. Therefore, taking into consideration manufacturing tolerances and the total circumference of the seal, highly effective results have been obtained with 95% of the total cross-sectional area of grooves 88 and 94 being filled with seal 100.

As a specific but non-limiting example, with flow passages 16 and 18 of a diameter of 2½ inches and employing a balanced stem expanding gate valve design for a 20,000 psi internal pressure, grooves 88 and 94 are of a thickness T1 of 3/16 inch and a depth D1 of 3/16 inch. Seal 100 formed of "Teflon" is of a thickness T of ⅛ inch and of a width W of 7/16 inch.

When gate assembly 30 is in a closed position and a substantial upstream line pressure is provided, the most common leakage path occurs between gate assembly 30 and upstream seat 78. However, fluid pressure on back face 80 of upstream seat 78 is exposed to line pressure only in the area between seal 100 and flow passage 18 as seal 100 forms a fluid tight barrier. In this position, only a limited portion of the entire back face 80 of upstream seat 78 is exposed to flow line pressure and upstream seat 78 is easily held in position within recess 72 and does not move outwardly or float toward gate segment 54.

Referring to FIG. 5, a modified embodiment of the invention is illustrated in which a seal 100A has end portions 110 of a V-shaped cross section and grooves 88A and 94A are provided in respective seat 78A and body portion 12A.

FIG. 6 discloses a further embodiment in which a seal 100B of an oval or elliptical cross section is positioned within grooves 88B and 94B in respective seat 78B and body portion 12B.

The sizes and proportions set forth above for the seats, seals, and associated grooves in the embodiment of FIGS. 1-4 apply equally to the embodiments of FIGS. 5 and 6.

What is claimed is:

1. A gate valve structure comprising a valve body having a valve chamber therein and inlet and outlet flow passages communicating with the valve chamber, an expanding valve assembly including a gate element and segment slidably mounted within the valve chamber for movement between open and closed positions of the gate valve structure with said gate element and segment expanding away from each other at the fully open position, said valve body having an annular recessed portion about each flow passage and a circumferential groove in each of the recessed portions facing the valve chamber, generally cylindrical seats about said flow passages for engaging said gate element and segment in the open and closed positions of the gate element and segment, each seat having a circumferential groove in opposed relation to the groove in the adjacent flow passage and fitting within an associated recessed portion in face-to-face abutting contact with the associated recessed portion, and a deformable seal of an elongate cross section positioned within each pair of opposed grooves and filling between 80 and 100 percent of the total cross-sectional areas of the combined facing grooves when the seat is pressed within the associated recessed portion, said elongate seal having a width between around 105 and 130% of the total combined depth of the associated grooves and a thickness between around 70 and 90% of the total thickness of the associated grooves, said seal upon being inserted within the opposed pair of grooves being deformed when the seat is in abutting contact with the associated recessed portion to fill substantially the entire cross-sectional area of the combined grooves and permitting face-to-face abutting contact between the seat and valve body without any portion of the seal being gripped between the opposed faces of the seat and valve body.

2. A gate valve as set forth in claim 1 wherein said grooves are of a generally V-shaped cross section and said elongate seal has generally V-shaped end portions.

3. A gate valve as set forth in claim 1 wherein said grooves are of an arcuate cross section and said elongate seal is generally oval with arcuate end portions.

4. A gate valve as set forth in claim 1 wherein said grooves are of a generally rectangular cross section and said elongate seal is generally rectangular in cross section.

5. A gate valve structure comprising a valve body having a valve chamber therein and an upstream flow passage communicating with the valve chamber, an expanding valve assembly including a gate element and segment slidably mounted within the valve chamber for movement between open and closed positions of the gate valve structure with said gate element and segment expanding away from each other at the fully open position, said valve body having an annular recessed portion about the upstream flow passage and a circumferential groove in the recessed portion facing the valve chamber, a generally cylindrical seat about the upstream flow passage and fitting within the recessed portion in face-to-face abutting contact with the recessed portion, and a deformable seal of an elongate cross section positioned within said groove and filling between 80 and 100% of the total cross-sectional area of the groove, said elongate seal prior to the seat being fitted within said recessed portion having a width between around 105 and 130% of the depth of the groove and a thickness between around 70 and 90% of the maximum thickness of the groove, said seal upon being inserted within the groove being deformed when the seat is fitted in face-to-face abutting contact within the recessed portion to fill substantially the entire cross-sectional area of the groove and permit the face-to-face abutting contact without any portion of the seal being gripped between the opposed faces of the seat and valve body.

6. A gate valve as set forth in claim 5 wherein said groove is of a generally rectangular cross section and said elongate seal is generally rectangular in cross section.

7. A gate valve as set forth in claim 5 wherein said groove is generally V-shaped and said elongate seal has V-shaped end portions.

8. A gate valve as set forth in claim 5 wherein said groove is of a generally arcuate cross section and said elongate seal is generally oval with arcuate end portions.

9. A gate valve as set forth in claim 5 wherein said deformable seal is formed of tetrafluoroethylene.

* * * * *